United States Patent
Osborne et al.

(10) Patent No.: US 11,726,505 B2
(45) Date of Patent: Aug. 15, 2023

(54) WATER CONTROL SYSTEM FOR AIRCRAFT

(71) Applicant: MAG Aerospace Industries, LLC, Carson, CA (US)

(72) Inventors: Deborah Osborne, Redondo Beach, CA (US); Nguyen Tram, Chino Hills, CA (US); Arnaud Namer, Torrance, CA (US); Jean Gayoso, Los Angeles, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 617 days.

(21) Appl. No.: 16/747,951

(22) Filed: Jan. 21, 2020

(65) Prior Publication Data
US 2021/0223799 A1    Jul. 22, 2021

(51) Int. Cl.
G05D 9/00    (2006.01)
B64C 19/00    (2006.01)
G05D 7/01    (2006.01)
B64D 11/02    (2006.01)

(52) U.S. Cl.
CPC ............. *G05D 9/00* (2013.01); *B64C 19/00* (2013.01); *G05D 7/01* (2013.01); *B64D 11/02* (2013.01)

(58) Field of Classification Search
None
See application file for complete search history.

(56) References Cited

U.S. PATENT DOCUMENTS

| | | | |
|---|---|---|---|
| 6,700,503 B2 | 3/2004 | Masar et al. | |
| 6,965,818 B2 | 11/2005 | Koenig et al. | |
| 7,746,248 B2 | 6/2010 | Leroy et al. | |
| 8,568,585 B2 | 10/2013 | Nolan | |
| 9,008,868 B1 | 4/2015 | Bantoft et al. | |
| 9,409,795 B2 | 8/2016 | Nolan | |
| 9,546,472 B2 | 1/2017 | Burd | |
| 9,783,308 B2 | 10/2017 | Holmes et al. | |
| 2003/0028336 A1* | 2/2003 | Masar ............... | H04L 67/75 |
| | | | 702/55 |
| 2004/0186634 A1 | 9/2004 | Lucky et al. | |
| 2007/0130093 A1* | 6/2007 | Haji-Valizadeh ...... | G06Q 50/06 |
| | | | 705/413 |

(Continued)

FOREIGN PATENT DOCUMENTS

DE    102011117234    5/2013
EP    2452875    5/2012

(Continued)

OTHER PUBLICATIONS

International Patent Application No. PCT/US2021/014426, International Search Report and Written Opinion, dated May 10, 2021, 11 Pages.

*Primary Examiner* — Daniel L Greene
(74) *Attorney, Agent, or Firm* — Kilpatrick Townsend & Stockton LLP

(57) ABSTRACT

The present application generally relates to aircraft water management. The disclosed system provides an initial step of verifying the amount of available water on board and dynamically regulating water usage during flight based on projections and comparisons between projections and actual usage. The system implements a series of water conservation strategies modeled on historical data, using a control system to manage water usage.

14 Claims, 6 Drawing Sheets

(56) References Cited

U.S. PATENT DOCUMENTS

| | | | |
|---|---|---|---|
| 2009/0119142 A1* | 5/2009 | Yenni | H04L 67/12 |
| | | | 705/7.15 |
| 2010/0289652 A1* | 11/2010 | Javey | G08B 21/20 |
| | | | 340/603 |
| 2011/0035063 A1* | 2/2011 | Palayur | G06Q 50/06 |
| | | | 700/282 |
| 2011/0050395 A1* | 3/2011 | Ervin | F17D 5/02 |
| | | | 702/51 |
| 2011/0120886 A1* | 5/2011 | Jha | B01D 61/48 |
| | | | 204/229.8 |
| 2017/0053360 A1* | 2/2017 | Loeb | G06Q 50/06 |
| 2017/0351978 A1* | 12/2017 | Bellowe | G06Q 50/01 |
| 2019/0127086 A1 | 5/2019 | Bis et al. | |
| 2019/0270419 A1* | 9/2019 | Martin | F16D 65/847 |
| 2020/0398988 A1* | 12/2020 | Goyal | G01F 15/063 |

FOREIGN PATENT DOCUMENTS

| | | |
|---|---|---|
| EP | 3754452 A1 | 12/2020 |
| WO | 2017222848 | 12/2017 |
| WO | 2021150759 A1 | 7/2021 |

* cited by examiner

WATER CONTROL SYSTEM FOR AIRCRAFT

FIELD OF THE DISCLOSURE

The present application generally relates to aircraft water management. The disclosed system provides an initial step of verifying the amount of available water on board and dynamically regulating water usage during flight based on projections and comparisons between projections and actual usage. The system implements a series of water conservation strategies modeled on historical data, using a control system to manage water usage.

BACKGROUND

Traditionally, when aircraft land between flights, the ground crew refills the main potable water tanks to capacity. For example, while servicing a stationary aircraft, ground service personnel typically access a water service panel under the belly of the aircraft in order to determine the current water level in the aircraft. Based on only the current water level in the aircraft and the distance to the next destination of the aircraft, without any further data or analytics, the ground service personnel typically fills the aircraft's water tank to ensure that there is enough water on the aircraft for the flight to the next destination. This basic way of filling an aircraft's water tank leads to inefficiencies. For example, an aircraft's water tank can be filled with more water than is required for a flight (or series of flights), thereby increasing weight and thus the operational cost of the aircraft. For example, a short one-hour flight will not necessarily need a completely full water tank, whereas an international flight is likely to need the water tank filled to capacity. If the tank for the short one-hour flight is filled to capacity, the aircraft's weight is likely much heavier than necessary. As another example, water may be added to an aircraft potable water tank when the aircraft already has sufficient water for a flight (or series of flights), thereby increasing the turnaround time for an aircraft (which can decrease overall income for the aircraft) and misallocating resources.

Additionally, even if the amount of water carried on board the aircraft is managed accurately, if surprise usages occur during a particular flight (or series of flights), the managed water upload may be insufficient to provide water needed for the flight.

Accordingly, systems that use aircraft water data to reduce inefficiencies (and thereby reduce operational costs, decrease aircraft turnaround time, and/or better allocate resources) are needed. Additionally, systems that manage and regulate water usage in-flight are also needed. The present disclosure thus provides a system for dynamically managing water usage during flight based on a series of water conservation strategies that are modeled using historical water usage data.

SUMMARY

The present disclosure thus provides a system that controls water distribution during flight using a series of water conservation strategies. The general goal is to manage water usage on board at various stages of flight or in various portions of the aircraft. Using the disclosed water control system for aircraft can help reduce fuel consumption, lower aircraft turnaround time at the gate, thereby saving time and money.

Embodiments relate to a water control system for an aircraft, comprising: identifying an optimal water upload recommendation for an aircraft based on historical water usage data and relevant flight data; and managing water usage in-flight based on a series of water conservation strategies in order to optimize and save water onboard. Managing water usage in-flight may comprise receiving data about expected usage vs. actual water usage and restricting water flow at one or more water restriction locations. The system may use one or more regulators configured to restrict water usage.

Further embodiments relate to a water control system for aircraft for managing water usage in-flight comprising: a potable water storage tank; one or more water tank level sensors; one or more water usage devices; a memory; an interface for aircraft communication, wherein the water control system receives historical water usage data and implements a series of water conservation strategies during flight.

The control may be configured to include historical water usage data from one or more prior flights of the same aircraft. The control may be configured to include historical water usage data from a plurality of prior flights of aircraft along the same or similar route.

The control may be configured to compare actual water usage during flight to the historical water usage data. The control may be configured to make a determination on whether the current flight water consumption may exceed the remaining water stored in the tank. The water conservation strategies may be determined by historical water usage data, aircraft configuration, passenger count, flight operator, flight profile, flight route, calendar season, or any combination thereof.

The control may modify the water consumption at one or a plurality of water usage devices based on the determination based on historical water usage data and water conservation strategies. The control may be configured to provide a recommended water fill level for optimized water consumption for a next flight of similar aircraft configuration, passenger count, flight operator, flight profile, flight route, calendar season, or any combination thereof.

The control may be configured to access a machine learning algorithm to make a determination on whether the current flight water consumption may exceed the remaining water stored in the tank. The control may modify the water consumption at one or a plurality of water consumption users based on the machine learning output determination and water conservation strategies.

Embodiments also relate to a method for modifying water consumption onboard a vehicle including static or dynamic regulation of water output for the purpose of water conservation. The method may include regulation at the water tank, at one or more water distribution lines, at one or more water usage devices, or any combination thereof. An individual water usage device may be configured with one or more water conservation strategies for the purpose of water conservation. The one or more water conservation strategies may comprise a water restriction valve, a pressure regulator, or any combination thereof.

DETAILED DESCRIPTION

Figure 1:
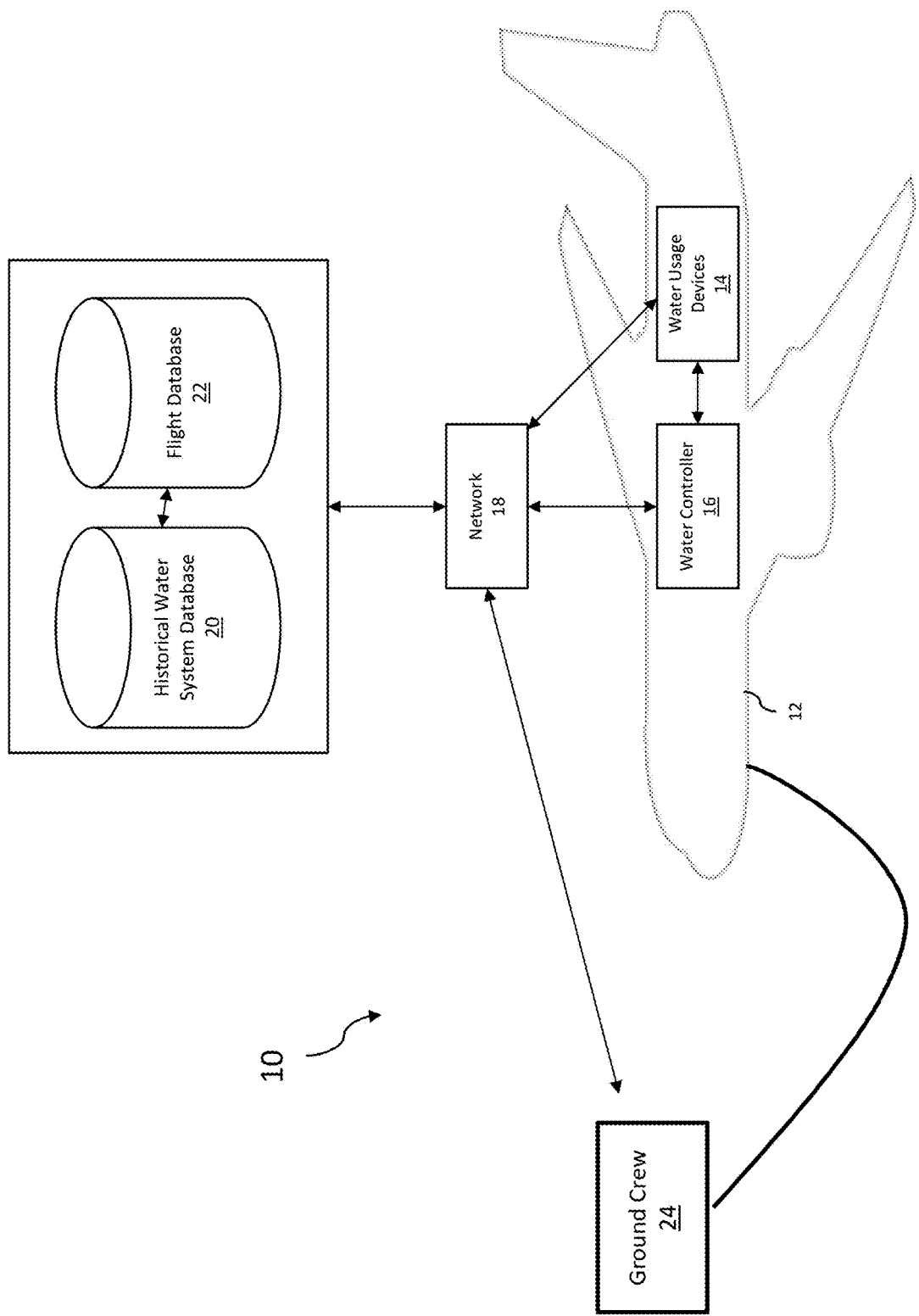
FIG. 1 shows a schematic of a water data collection and water upload prediction system.

Examples are described herein in the context of systems and methods to manage and control aircraft water usage during flight. As background, the water conservation strategies described herein will typically be implemented when an aircraft potable water tank is filled to a level that is less than its full capacity at the beginning of a flight segment. This can occur when various fill systems or algorithms are used to detect instances when a particular aircraft or flight does not need to carry a full tank of water based on historical water usage data. Various types of fill systems are described by WO/2017/222848, titled "Wireless Water and Waste System Monitoring and Optimization for Aircraft Servicing and Management," and U.S. Publication No. 2004/0186634 titled "Adaptive Potable Water Fill System for an Aircraft." Both of these publications seek to use historical water usage data in order to limit the amount of water uploaded to an aircraft in order to conserve water and time. They are focused on water fill systems.

The water conservation strategies may also be implemented if water consumption by users is unusually high or if a leakage condition is detected during a flight segment.

As an initial matter, a first system 10 generally tracks historical water usage on board an aircraft 12. As background, aircraft 12 generally support a plurality of water usage devices 14. These include but are not limited to lavatory sinks, lavatory toilets, galley sinks, humidifiers, air conditioning units, and others, or any combination thereof. Each water usage device 14 may be associated with a water controller system 16, described in more detail below. Each water usage device 14 may also be associated with an aircraft network 18. This network 18 can help compile historical water usage data. This historical water usage data may be saved in a historical water system database 20. The historical water system database 20 may also communicate with the flight database 22, which can inform the network 18 about typical water usage by flight.

For example, during a flight on aircraft 12, the network 18 may receive water usage data, such as the number of gallons of water used during the flight, the number of times the lavatories have been flushed during the flight, the amount of potable water consumed, and/or the current water level in the aircraft from the water usage devices 14. The flight database 22 also contains data about the number of passengers on board, the amount of water carried on board, departure and destination locations, duration of flight, delays, weather conditions, and so forth. There may be provided a single mini-controller and/or sensor or a system of mini-controllers and/or sensors to collect the relevant operational data before and/or during and/or after each flight from the partner airline such as, and not limited to, operator, water intake, water used, route, number and category of passengers, season of the year, etc. Collection of data for operator, route, number and category of passengers, season of the year may be performed using aircraft communication systems and data management systems (including Water & Waste System, In Flight Entertainment System, Cabin Management System, and others). Collection of data for water intake may be performed using water tank sensing on ground while filling the water tank and/or in communication with ground/maintenance personnel communication systems. Collection of data for water used by aircraft lavatories and galleys may be performed during flight via one or more tank sensors, water sensors, or any other type of equipment usage data collection systems. Elements of the mini-controller(s) and/or sensor(s) communicate to on A/C systems and off A/C data systems using wired or wireless communication, Bluetooth, or any other radio or satellite interfaces, or a combination thereof. The information collected may be analyzed during operation/during flight, by cloud analytic systems or by ground based analytic systems. The network 18 can store/analyze the water usage data, which is stored in the historical water system database 20.

Water usage data for particular flight distance or duration can be stored by the historical water system database 20 (which communicates with and can pull data from the flight database 22), in order to obtain flight data such as origination and destination cities, routes, number of passengers, duration of flight, weather, flight delays, and so forth. By analyzing historical water usage based on and compared against various flight parameters, an informed recommendation can be made about how much water needs to be carried on board for a similar flight (e.g., similar destination, similar time of day, similar number of passengers, similar duration, and so forth). Managing the data in this way can help limit and save water uploaded to the aircraft before a flight, based on the current flight's data (e.g., passengers, routes, weather, etc.) so that the dispensing of water during the flight will satisfy the passenger needs, but not be in too much excess.

Figure 2:
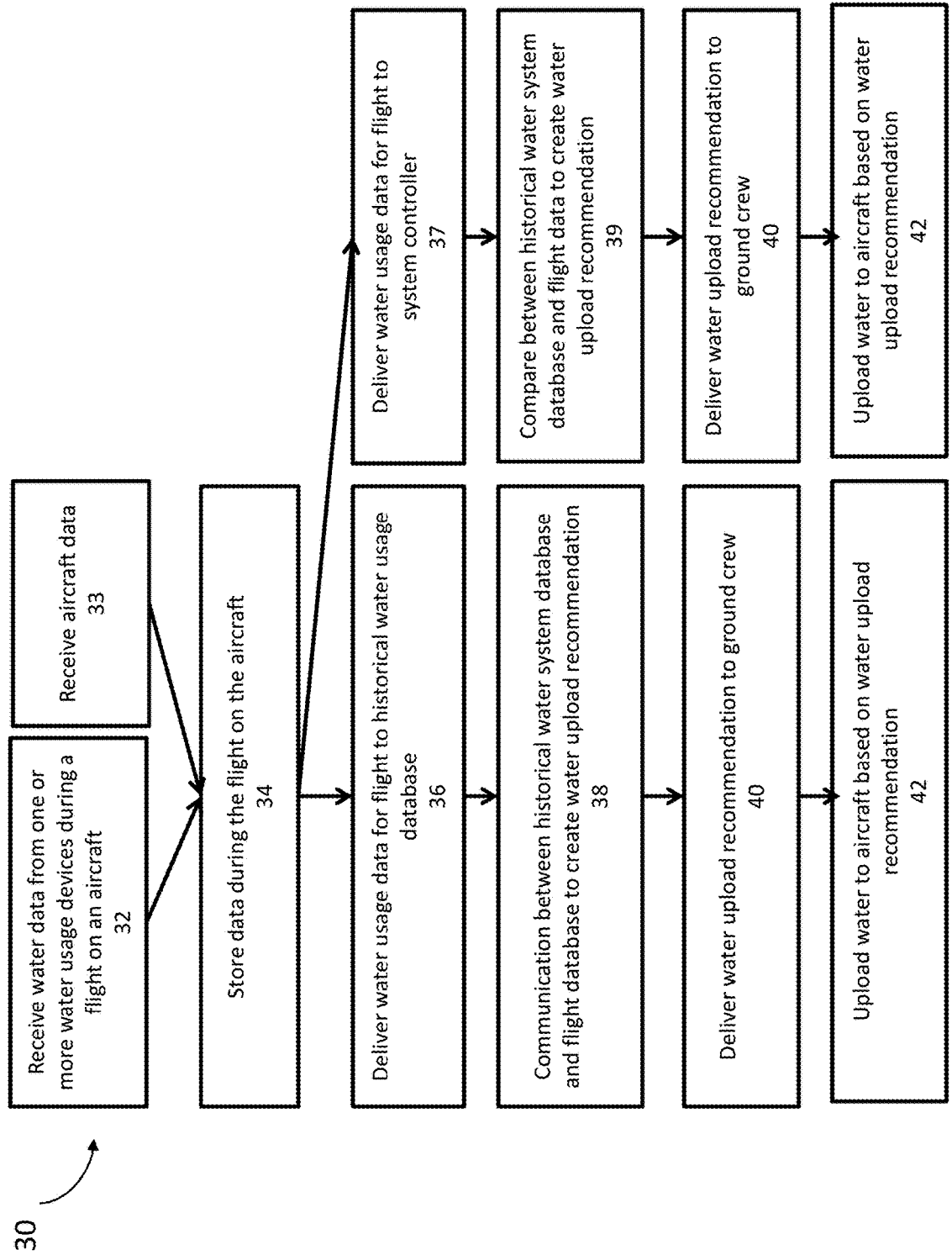
FIG. 2 shows a flow chart of the process of FIG. 1.

This data can be compiled and a recommendation can be delivered to the ground crew 24. This can allow the ground crew 24 to fill the aircraft 12 with a sufficient amount of water required for the upcoming flight or series of flights. The recommendation can be based on information collected by the historical water system database 20 and the flight database 22. The recommendation can be delivered wirelessly to the ground crew 24 such that they are prepared for immediate aircraft servicing. This flow of information is outlined by the FIG. 2 flowchart 30. The water uploaded recommendation may occur on the aircraft (illustrated by the left hand column) or off the aircraft (illustrated by the right hand column).

The present assignee has filed a patent application directed to a historical water collection concept and creation of a water upload recommendation, outlined in WO/2017/222848, the contents of which are hereby incorporated by reference. However, once the recommended amount of water has been uploaded to the aircraft 12, that disclosure does not address dynamic in-flight management of water in order to ensure sufficient water remains for the duration of the flight. The concepts disclosed herein are thus directed to the water upload recommendation, as well as to the in-flight management of water, thereby improving the accuracy of end of flight upload recommendation.

In addition to the first system 10 designed to collect historical data and make a water upload recommendation, FIG. 3 illustrates a second system 50 that is designed for dynamic in-flight water management using a series of water conservation strategies. The in-flight water management system 50 helps save water in order to reduce fuel consumption at various stages of flight or to ensure that sufficient water remains available for the duration of the flight. These stages include but are not limited to take-off, cruise and landing. Accordingly, in combination with the accumulated data from previous flight(s) water profile/usage(s) that helps inform the water upload recommendation as outlined by first system 10, the second system 50 dynamically and actively manages the water that has been uploaded to the potable water tank during flight.

This management is based on a series of "water conservation strategies" that are used during flight and developed using historical water usage data. Thus, whereas some of the prior art identified above focuses on identifying an appropriate water fill level for the aircraft during servicing on ground, the present disclosure focuses on an active/dynamic water management system during flight so that the limited water carried on board is managed to last the entire flight. The disclosed system may implement its water conservation strategies using a control system, including a plurality of water regulators, valves, pressure management systems, and so forth.

An actuation system for water regulation can manage the water quantity dispensed at different locations of the aircraft lavatories and galleys. The water regulation and or dispensing can be controlled by a software-based system for the water and waste system, a hardware-based system, or some combination thereof. The data from the various sensors collected can be analyzed and provided to the water control system 16, which will drive an actuation system for water regulation that manages water quantity dispensed at different locations on board the aircraft. Water dispensing regulation may be done by various methods, such as flow regulators at the water tank outlet, or active/dynamic regulators and the point of use/delivery restriction.

Figure 3A:
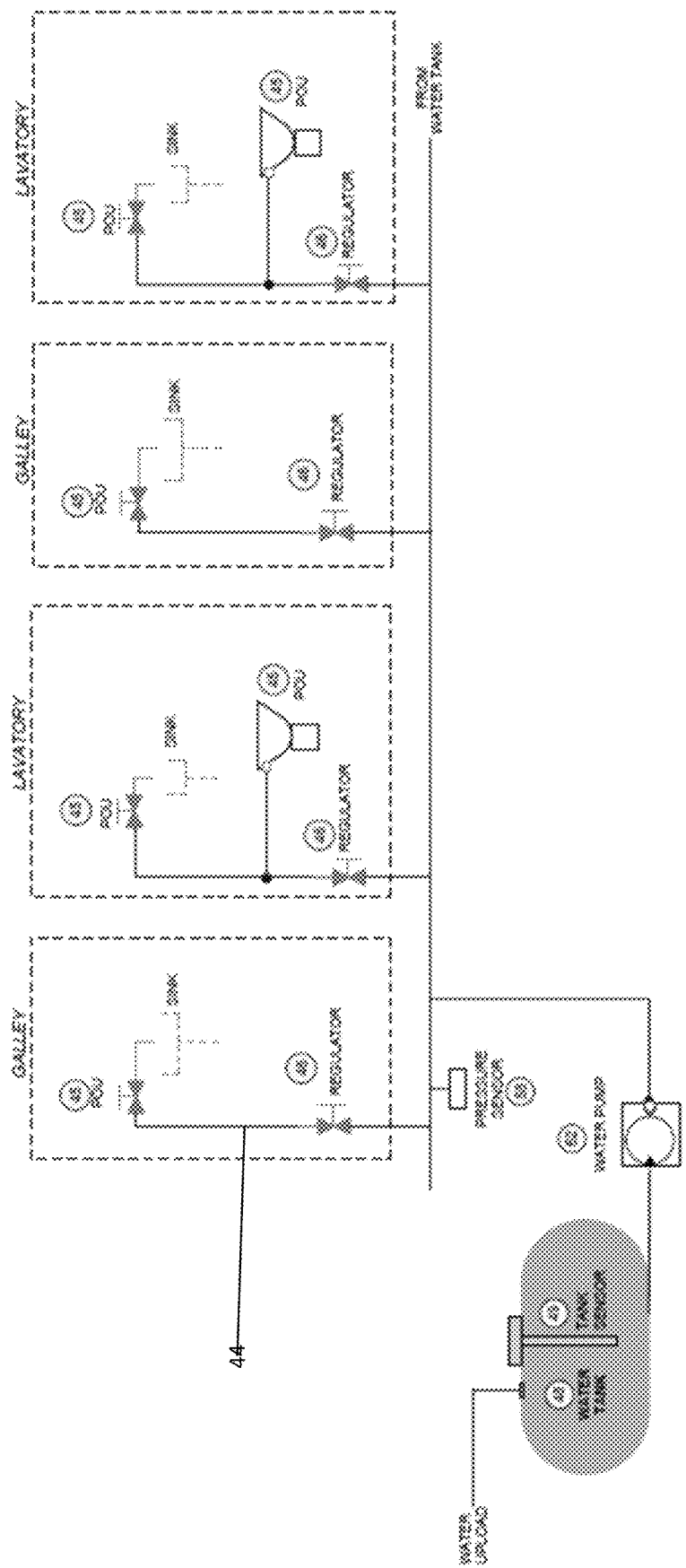
FIG. 3A shows a water flow diagram illustrating flow or pressure control that may be implemented at water distribution lines.
Figure 3B:
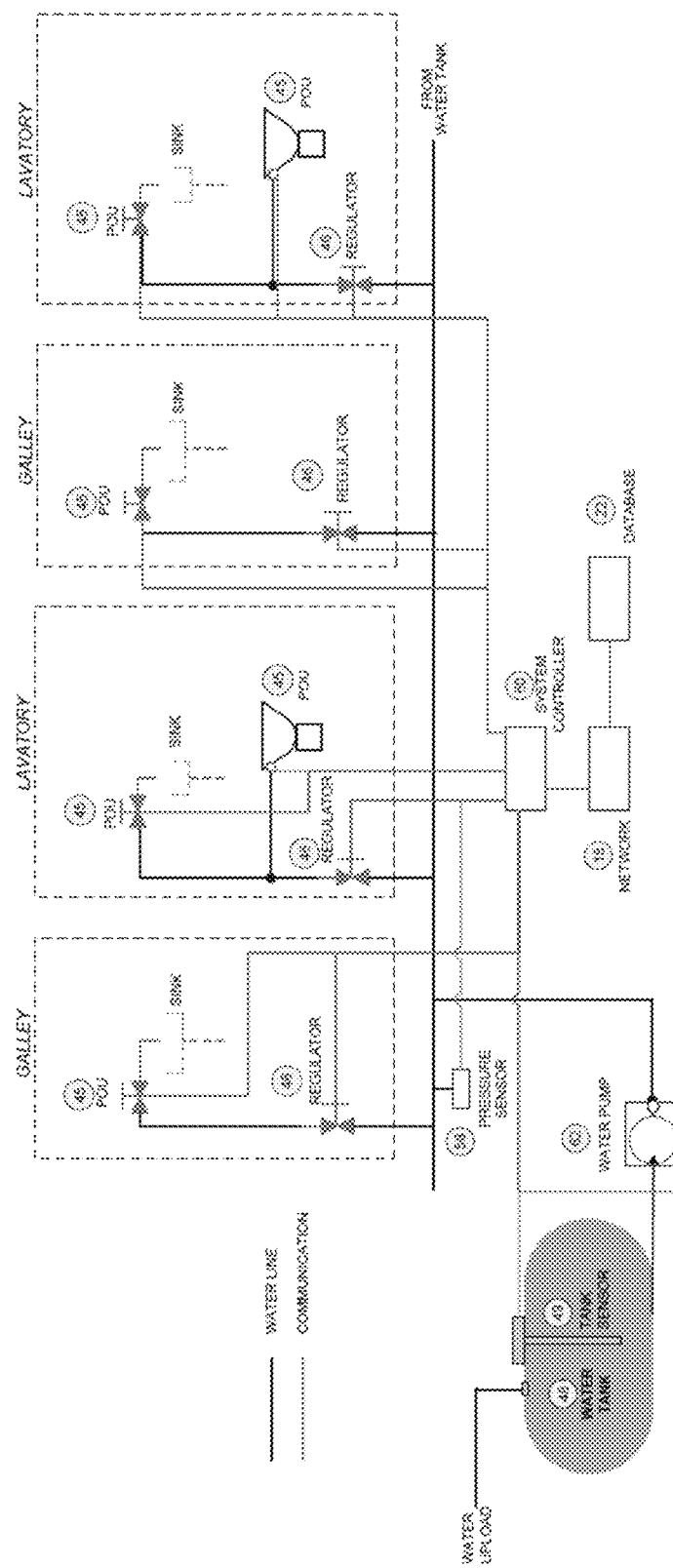
FIG. 3B shows a water flow diagram illustrating flow or pressure control that may be implemented at water distribution lines, showing various system controllers networks and databases that may be used to manage flow.
Figure 3C:
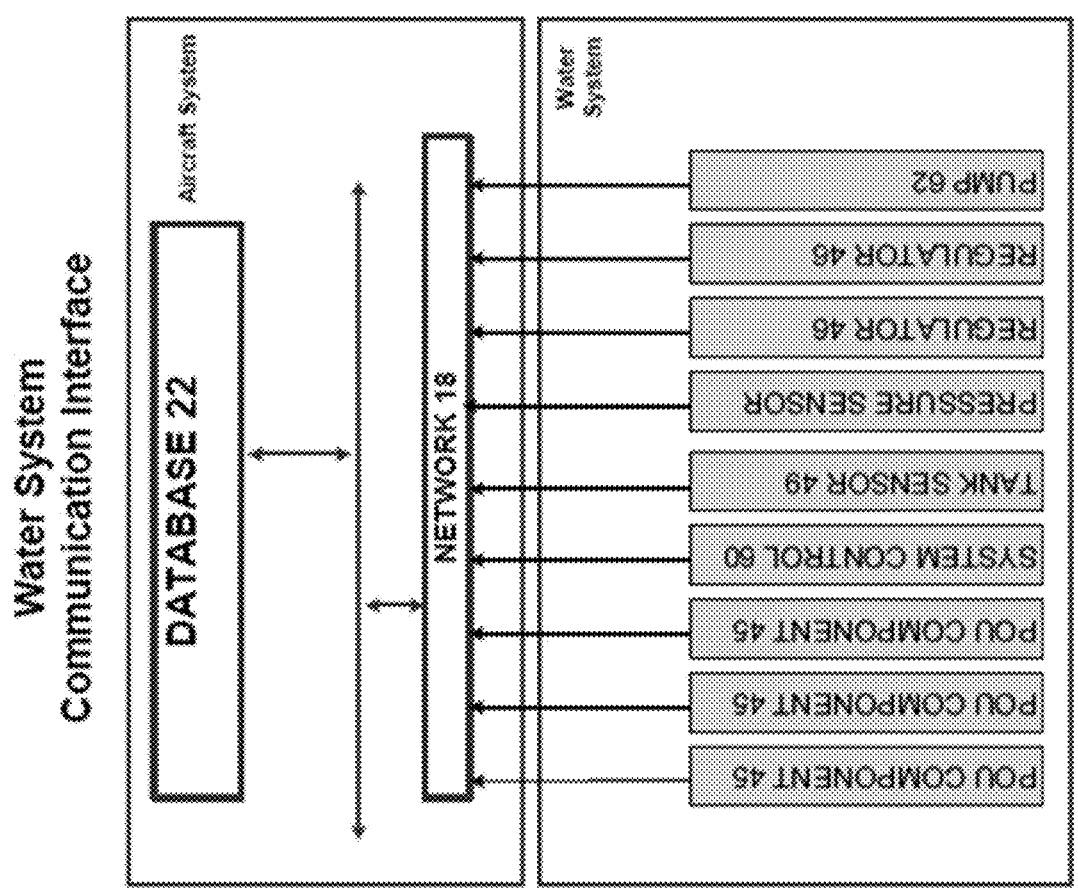
FIG. 3C shows one embodiment of a water system communication interface of FIG. 3B.

The general goal of the in-flight water management system 50 is to save water onboard an aircraft 12 during flight by controlling the water distribution line(s) 44. As illustrated by FIG. 3A, the water distribution line(s) 44 can employ a regulator 46 (to manage pressure, flow) at branch levels, which are the distribution lines that supply water to equipment at a lavatory (LAV) or galley (GAL). The regulator 46 may be any type of water management/control device. Non-limiting examples of exemplary regulators include valves, pumps, sensors, diaphragms, pressure controllers, mechanical systems, digital systems, any system that can manage or otherwise regulate water flow, or any appropriate combination thereof. FIG. 3A generally illustrates water upload, and delivery of water to various points of use 45, being managed by a regulator 46 at each point of use. FIG. 3B illustrates a similar flow configuration, also showing system controller 60, network 18, and database 22. FIG. 3C illustrates communication flow for a water system, showing the various mechanical components (point of use component 45, regulator 46, tank sensor 49, system control 60, pump 62) and how they communicate with a network 18 and a database 22.

Figure 4:
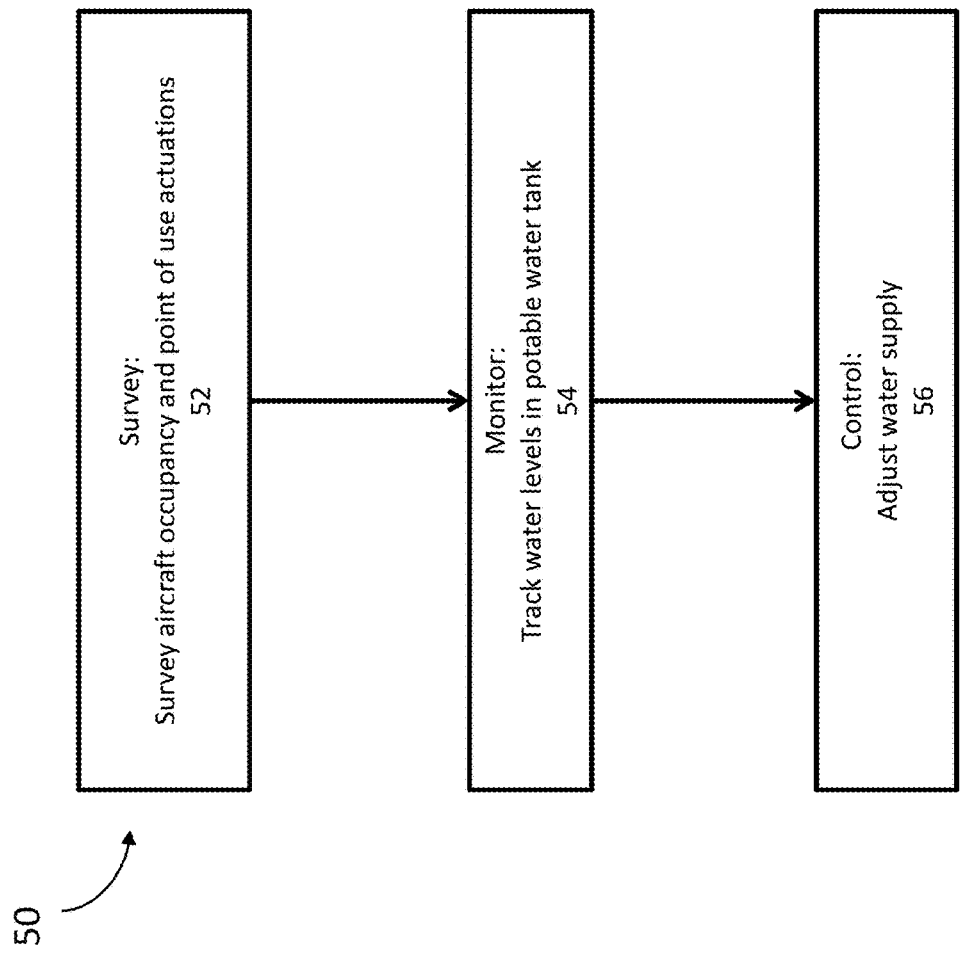
FIG. 4 shows a flow chart of the process of FIGS. 3A-3C.

As outlined by the flowchart of FIG. 4, one step of the in-flight water management system 50 is to gather data about the current number of passengers/aircraft occupancy. This can be done by pulling data from the aircraft flight database 22. In other examples, this can be done by detecting seat occupancy, in-flight entertainment unit usage or other methods. The in-flight water management system 50 may also gather data about the consumption of water by the point of use actuations during the current flight. This initial step is referred to as a survey phase 52.

The next phase is a monitoring phase 54. In this phase, water level(s) in the potable water tank are tracked as a function of the distribution requirement. This may be done by accessing data from water level sensors, accessing data about the point of use actuations, or any other monitoring process.

The next phase is to adjust the water supply in the water system (at the point of use, at other potential locations of regulation within the water system, or by modified operation of the pump) per water level/water amount left in the potable water tank as a function of predicted or expected water usage. This may be referred to as a control phase 56. This control phase implements a series of "water conservation strategies." The water conservation strategies may be set via an algorithm or may be manually controlled. The system may dynamically manage water on board the vehicle based on a learning model. For example, water conservation strategies may be based on historical water usage data from prior flights of the same aircraft, prior flights of the same route, aircraft layout/configuration, passenger count, flight operator, flight profile, flight route, calendar season, any other parameters, or combinations thereof. Behavior of passengers in various countries may also be considered, for example passengers traveling from Country X to Country Y may behave differently in their water usage habits than passengers traveling from Country A to Country B. Additionally, water usage behavior of passengers within regions may also change. The control system modifies the water consumption allowed at one or a plurality of water usage devices during the flight based on the learned algorithm. The learned algorithm may use various types of data in order to make a water conservation recommendation in real time during flight.

In one example, if an aircraft is configured to support a capacity of 200 passengers, but if the present flight is flying with fewer passengers (e.g., 100 passengers), it is likely that the potable water tank may be filled to a level that is less than full capacity prior to flight. The system of the present disclosure can then manage the available water during flight to assure that the 100 passengers on board have appropriate access to water, without depleting the water tank. The system may access data from one or more water sensors in the potable water tank to determine remaining water. If the water level dips below a preset threshold, it is possible to eliminate various water usage devices. For example, a lower amount of handwashing water or toilet flushing water may be delivered. In an alternate example, it is possible to limit water usage in certain locations of the aircraft but not limit others. In this example, handwashing or toilet flushing water delivery may be lessened in economy class, but not in business or first class. It is possible to limit water usage for certain galley components on board, such as limiting water delivered to coffee makers, water delivered to steam ovens, water delivered to galley sinks, or other options. Various mode levels may be set, such as "conservation mode," or "emergency conservation mode," indicating that water levels are reaching a low point.

The system may be set with an expected water usage threshold or estimate set for various portions of the flight based on historical data collected, and if the actual water usage exceeds the expected water usage threshold or estimate, the disclosed water conservation strategies may be employed.

For example, based on monitored data, the regulator 46 at each branch level can be activated to adjust flow and/or pressure in order to achieve water saving in order to meet the flight water demand in an effective and efficient way. (As outlined above, the term "regulator" is used herein to mean various valves, pumps, sensors, diaphragms, pressure controllers, mechanical systems, digital systems, any system that can manage or otherwise regulate water flow, or any appropriate combination thereof. Opening or closing the valves or pumps helps manage actual pressure in the water system and thus "regulates" the water supply. For example, pressure may be reduced in order to provide a lower water amount being delivered. Additionally or alternatively, water flow may be reduced in order to provide a lower water amount being delivered. Or, the water pump operation may be controlled to modify the system water pressure. One exemplary option that may be used to modify the water consumption is to modify valve open/close duration (thereby allowing less water to flow) and/or to modify the pump operation (with pressure sensor feedback) to control the overall system pressure.

Referring back to FIGS. 3A and 3B, aircraft water systems are provided with branch lines, also referred to as water distribution lines 44. Each branch line 44 is connected to a potable water tank 48 (it should be understood that main lines 58 is used between the potable water tank 48 and each branch line/water distribution line 44). In the example illustrated, regulators 46 are positioned at connection points between the main line 58 and the water distribution line 44. The regulators 46 may be used to manage the flow of water delivered to each point of use 45 device (which may be a sink, a toilet, or other water consumption device).

As shown by FIG. 3B, a monitor/control device 60 may communicate with the database 22, point of use components 45, regulators 46, and tank sensors 49. In use, the system 50 monitors in-flight water usage and can compare actual usage against expected usage. This comparison can occur at various times during the flight, such as before and after beverage service, midflight, a certain specified time prior to landing, or any other option. If the actual water usage is more than the expected usage at the designated flight time, water control may be implemented. This water control may be implemented by varying the system pressure or restricting the flow at any of the valves in the system (at the water distribution line/branch line 44 level, at the tank, or at the point of use components). The water control system can pull data from the algorithm and implement water conservation strategies as necessary.

In one example, if a particular amount and pressure of water is delivered for a toilet flush, but if water usage is more than is estimated to be expected at the designated flight time, less water may be delivered for toilet flushing in one or various portions of the aircraft. In another example, if a handwashing request typically delivers 10 ounces of water per request and if the actual water usage is more than is estimated to be expected at the designated flight time, a first handwashing request may deliver the standard 10 ounces of water, but any immediately following handwashing requests (based on the same user) may deliver a lesser amount of water for the second or subsequent hand wash water request (e.g., 5 ounces of water rather than the standard 10 ounces of water). If third and subsequent requests are continually made, the amount of water may be lowered even further (e.g., 2 ounces of water per subsequent request). This can be managed by the controller/regulator 46 at the branch level or at the point of use component. This may be implemented in one or various portions of the aircraft (e.g., only in the galleys, only in economy class, and so forth). The algorithm may have a cascading set of permissions, indicating which area of the aircraft should be restricted first.

Additionally, the output of communication between the sensors and control system can be used to optimize the choice of water upload at the next flight schedule, destination, and route for a given aircraft once landed. The output of communication can also be used to optimize the draining of the system after a flight or prior to next flight. For example, rather than draining an aircraft or reloading, if the water already onboard an aircraft is optimal for a different flight leg, the water servicing between flights can be eliminated, optimizing time and saving resources.

This data exchange and use can be a pre-requisite to machine learning regarding water management. There are two aspects that we may be used with respect to machine learning implementation or this system. In one example, the system may use machine learning based on a data set potentially currently available. In this instance, the algorithm is established off of the aircraft and loaded into software on the system controller or components. This machine learning is primarily based on historical water usage based on the previous flight path, flight duration, flight route, flight time, number and categories of passengers, season of the year, expected delays, and so forth. In an alternative example, the system may use active machine learning. In this instance, active algorithm can be adaptively learned and modified during flight. The ultimate goal is to improve accuracy of the end of flight upload recommendation based on the learned algorithm.

Referring back to FIGS. 3A-3C, the system monitor/control 60, may communicate with all "smart" components of the water system that contribute to the water conservation strategies. These may include the tank sensor 49, the point of use (POU) components 45, regulators 46, database 22. This communication may take place via exchange of information wirelessly or over the aircraft network.

In summary, this disclosure provides a way to enable an aircraft to uptake the minimum amount of water expected to be used based on flight data for the aircraft route, thus minimizing the water weight, depending on various flight parameters (such as but not limited to the route, flight duration, flight time, number and categories of passengers, season of the year, expected delays, and so forth), while not risking running out of water during flight. This is because the water upload recommendation can be made based on historical water usage that has been analyzed for optimization. The disclosure then provides a way to enable the aircraft to actively modify water usage by dynamically activating various water conservation strategies set from an algorithm during the flight in order to manage water availability throughout the flight duration. The water conservation strategies may be implemented from an algorithm defined by machine learning, whether a pre-determined defined set of algorithms or an actively-learned algorithm during flight.

The principles are thus based on "learning" by experience (based on data from the aircraft) about the quantity of water used depending on a list of flight data. Then, the system regulates water usage at lavatories and galleys and any other points of water use depending on the water remaining in the tank and the projected water consumption for the current flight leg. The system optimizes water delivery in the aircraft to provide the smallest negative impact possible on the passenger and flight crew experience.

While some examples of devices, systems, and methods herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

Examples of methods disclosed herein may be performed in the operation of computing devices. The order of the phases presented in the examples above can be varied—for example, phases can be re-ordered, combined, and/or broken into sub-phases. Certain phases or processes can be performed in parallel. Thus, while the steps of methods disclosed herein have been shown and described in a particular order, other examples may comprise the same, additional, or fewer steps. Some examples may perform the steps in a different order or in parallel. In some examples, one or more steps in a method described herein may be optional.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A water control system for an aircraft, the water control system comprising:
    a regulator configured to manage a flow of water delivered to a point of use device on the aircraft; and
    a control device configured to:
        determine a water upload recommendation for the aircraft based on historical water usage data and a flight parameter of a current flight;
        predict water usage based on the historical water usage data;
        determine a water conservation strategy for managing water usage in-flight based on the historical water usage data, actual water usage during the current flight, and the predicted water usage during the current flight; and
        control the flow of water delivered to the point of use device by controlling the regulator pursuant to the water conservation strategy, wherein, when the actual water usage is greater than the predicted water usage, the regulator is controlled to deliver a progressively decreasing amount of water usage for each subsequent water request of two or more subsequent water requests for one or more water usage devices.

2. The water control system of claim 1, wherein the regulator is configured to restrict water usage and comprises one or more of a pump, a valve, or a diaphragm.

3. A water control system for aircraft for managing water usage in-flight comprising:
    a potable water storage tank;
    one or more water tank level sensors for measuring an actual water level within the portable water storage tank;
    one or more water usage devices;
    a control device;
    a memory; and
    an interface for aircraft communication,
    wherein the control device is configured to:
        receive historical water usage data;
        receive the water level from the one or more water tank level sensors;
        predict water usage based on the historical water usage data;
        determine one or more in-flight water conservation strategies based on the historical water usage data, the actual water level, and the predicted water usage during a current flight; and
        during a flight, control a flow of water to the one or more water usage devices pursuant to the one or more water conservation strategies, wherein, when the actual water usage is greater than the predicted water usage, a regulator is controlled to deliver a progressively decreasing amount of water usage for each subsequent water request of two or more subsequent water requests for one or more water usage devices.

4. The water control system of claim 3, wherein the historical water usage data comprises water usage data from one or more prior flights of the same aircraft.

5. The water control system of claim 3, wherein the historical water usage data comprises water usage data from a plurality of prior flights of a plurality of aircraft along the same or similar route.

6. The water control system of claim 3, wherein the control device is configured to determine the one or more in-flight water conservation strategies by comparing actual water usage during flight to a predicted water usage based on the historical water usage data.

7. The water control system of claim 3, wherein the control device is configured to determine the one or more water conservation strategies based on a flight parameter of a current flight, wherein the flight parameter comprises one or more of an aircraft configuration, a passenger count, a flight operator, a flight profile, a flight route, a calendar season, or any combination thereof.

8. The water control system of claim 3, wherein the control device is configured to modify water consumption at the one or more water usage devices by controlling one or more regulators.

9. The water control system of claim 3, wherein the control device is configured to determine a recommended water fill level for a next flight of similar aircraft configuration, passenger count, flight operator, flight profile, flight route, calendar season, or any combination thereof.

10. The water control system of claim 3, wherein the control device is configured to determine the one or more in-flight water conservation strategies by determining whether the current flight water consumption may exceed the remaining water stored in the tank.

11. A method for controlling water consumption onboard a vehicle, the method comprising:
    receiving an actual water level from one or more water tank level sensors;
    receiving historical water usage data from one or more water tank level sensors;
    predict water usage based on the historical water usage data;
    determining one or more in-flight water conservation strategies based on the historical water usage data, the actual water level, and the predicted water usage during a current flight; and
    during a flight, controlling a flow of water to the one or more water usage devices pursuant to the one or more one or more water conservation strategies by controlling a regulator, wherein, when the actual water usage is greater than the predicted water usage, the regulator is controlled to deliver a progressively decreasing amount of water usage for each subsequent water request of two or more subsequent water requests for one or more water usage devices.

12. The method of claim 11, wherein controlling water consumption comprises regulating water flow at one or more of a water tank, one or more water distribution lines, one or more water usage devices, or any combination thereof.

13. The method of claim 11, further comprising controlling water consumption based on a comparison of a current water usage with the historical water usage.

14. The method of claim 13, wherein controlling water consumption comprises controlling a water restriction valve, a pressure regulator, or any combination thereof as the regulator.

* * * * *